US011862919B2

(12) United States Patent
College

(10) Patent No.: US 11,862,919 B2
(45) Date of Patent: Jan. 2, 2024

(54) TWO STAGE SHEAR PERMITTING TERMINAL EXTRUSION

(71) Applicant: TE Connectivity Services GmbH, Schaffhausen (CH)

(72) Inventor: David Alan College, Middletown, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/579,227

(22) Filed: Jan. 19, 2022

(65) Prior Publication Data

US 2023/0231351 A1 Jul. 20, 2023

(51) Int. Cl.
*H01R 43/055* (2006.01)

(52) U.S. Cl.
CPC ............ *H01R 43/055* (2013.01); *Y10T 29/42* (2015.01); *Y10T 29/49005* (2015.01)

(58) Field of Classification Search
CPC ......... Y10T 29/49181; Y10T 29/49185; Y10T 29/5149; Y10T 29/53235; H01R 43/04; H01R 43/045; H01R 43/048; H01R 43/055
See application file for complete search history.

(56) References Cited

U.S. PATENT DOCUMENTS

| | | | | |
|---|---|---|---|---|
| 3,969,806 A * | 7/1976 | McCaughey | ........ | H01R 43/048 29/515 |
| 4,411,484 A * | 10/1983 | Casey | .................... | H01R 43/04 29/866 |
| 4,598,570 A * | 7/1986 | Baldyga | ............... | H01R 43/045 83/228 |
| 5,456,005 A * | 10/1995 | Satoh | ................... | H01R 43/048 29/749 |
| 5,636,438 A * | 6/1997 | Takagishi | ............... | H01R 43/04 29/761 |
| 5,706,570 A * | 1/1998 | Inoue | ................... | H01R 43/048 72/448 |
| 5,752,405 A * | 5/1998 | Gerst | ................... | H01R 43/048 72/350 |
| 10,476,177 B2 * | 11/2019 | Okuda | ................... | H01R 4/184 |

* cited by examiner

*Primary Examiner* — Peter Dungba Vo
*Assistant Examiner* — Joshua D Anderson

(57) ABSTRACT

A system for separating terminals (e.g., electrical terminals) from a terminal strip includes a shear tool movably mounted to a frame for selectively shearing the terminal from the terminal strip. A primary shear depressor is provided for driving the shear tool from an initial position to an intermediate position during which the terminal is sheared from the terminal strip. A secondary shear depressor is movably mounted to the primary shear depressor for driving the shear tool from the intermediate position after the terminal has been sheared from the terminal strip, to a final position.

16 Claims, 4 Drawing Sheets

TWO STAGE SHEAR PERMITTING TERMINAL EXTRUSION

FIELD OF THE INVENTION

The present invention relates to the processing of terminals, and more specifically, to an improved system and method for separating terminals from a terminal strip during a crimping process.

BACKGROUND

Crimping or terminating systems for securing a terminal onto an element, such as an electrical conductor, typically include an applicator configured to feed a strip of terminals from a reel into position for crimping the terminals onto the conductor. A convenient and inexpensive way to separate a terminal from the strip of terminals is to implement a tool or "depressor" attached to the movable end of an applicator ram used to drive a crimping die. As the applicator ram is moved, the depressor engages with a passive terminal shear or shear tool which shears the terminal from the strip just after the terminal is captured in the crimping tooling.

The resulting shear plane is usually positioned very near the end of the terminal as a result of requirements of the crimp design, which limits the size of the cut-off tab. However, there may be crimp designs for which the volume of wire material and crimp barrel material of the terminal being crimped may cause the crimped material to extrude longitudinally. The extruded material can contact or interfere with the terminal shear arranged immediately adjacent to the sheared end of the terminal. This may be particularly likely during the crimping of large terminals used with large wire for high voltage applications. Contact between the terminal and the terminal shear during crimping can negatively affect the consistency and quality of the resulting crimp.

Accordingly, there is a need for improved systems and methods which prevent extruded terminal material from engaging or contacting the terminal shear during the crimping process.

SUMMARY

In one embodiment of the present disclosure a system for separating terminals from a terminal strip includes a shear tool movably mounted to a fixed frame. A primary shear depressor is provided for driving the shear tool from an initial position to an intermediate position and selectively shearing a terminal from a terminal strip. A secondary shear depressor is movably mounted to the primary shear depressor for further driving the shear tool from the intermediate position after the terminal has been sheared from the terminal strip, to a final position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
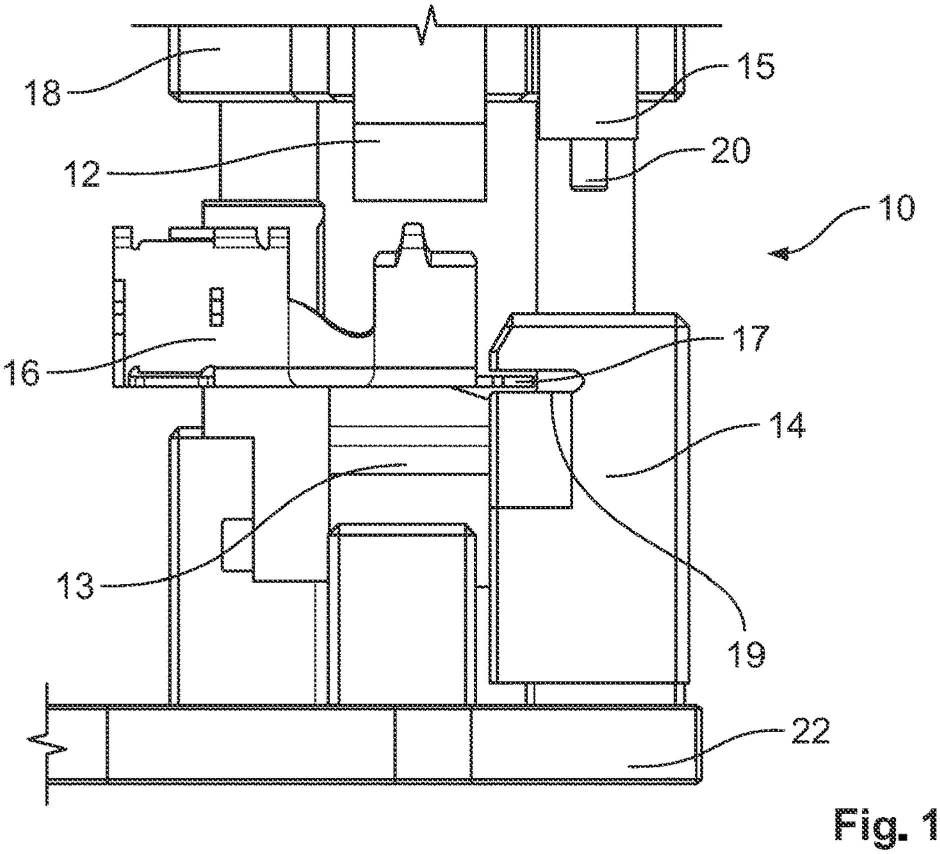
FIG. 1 is a side perspective view of a terminal applicator according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to embodiments of the present disclosure, a system for separating a terminal (e.g., an electrical terminal) from a terminal strip comprising a plurality of terminals during a crimping operation is provided. The system includes a movable terminal shear or shear tool for receiving a terminal of the terminal strip. The shear tool is driven (e.g., downwardly) by a primary shear depressor from an initial position to an intermediate position for shearing the terminal from the strip. The primary depressor may be fixedly mounted to an applicator ram or crimping actuator which performs the crimping operation of the terminal after it has been separated. A secondary shear depressor according to embodiments of the present disclosure is movably mounted to the primary shear depressor. After the terminal has been sheared from the terminal strip and the primary depressor has reached the end of its travel, the secondary shear depressor is operative to drive the terminal shear further downwardly from the intermediate position and out of an extrusion space into which the crimped terminal may extend during crimping. The operation of the secondary shear depressor may be passive in nature, acting in an automatic manner without the need for additional operator and/or control system input.

Embodiments of the present disclosure will be described in more detail in the context of an exemplary simplified system or terminal applicator for crimping an electrical terminal to a conductor. Specifically, referring to FIGS. 1-3, a terminal applicator 10 for performing terminating or crimping operations is configured to feed a terminal strip 17 comprising a plurality of interconnected terminals 16 into a crimping position in which a free end of a conductive wire or cable will be fixed thereto. The applicator 10 includes a movable crimping die 12 and an opposing stationary crimping die 13 between which the terminal 16 is arranged in the crimping position. The crimping die 12 is fixedly connected to a movable end of an applicator ram or crimping actuator 18. As shown, the applicator ram 18 may include, for example, one or more pneumatic or hydraulic cylinders or a motor-driven mechanism for selectively moving the crimping die 12 in the vertical direction(s) during crimping operations.

Figure 2:
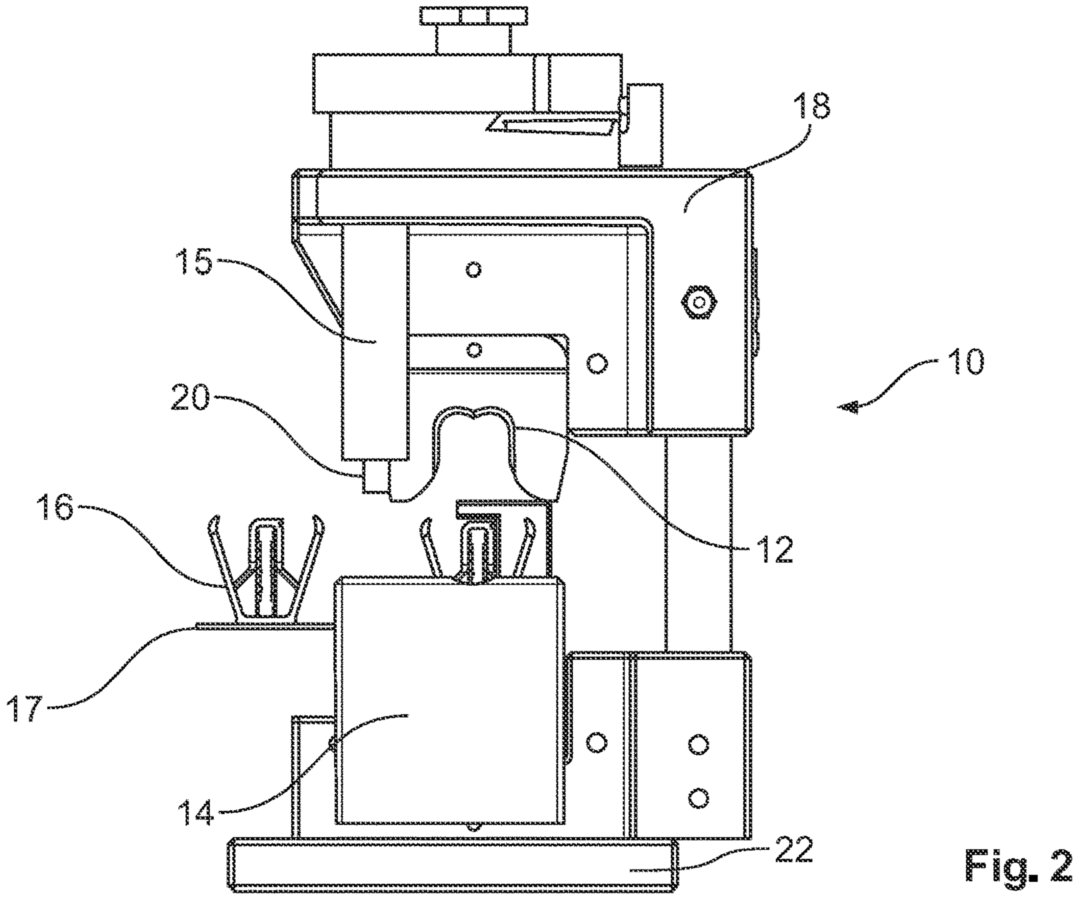
FIG. 2 is a second side perspective view of the terminal applicator of FIG. 1.

As set forth above, a passive terminal shear or shear tool 14 is provided for cutting or separating the terminal 16 from a remainder of the terminal strip or tape 17 prior to, but in conjunction with, the crimping process. Specifically, the exemplary terminal shear 14 includes a body having a slotted opening 19 formed therethrough and defining a shearing blade or edge. The opening 19 receives the terminal strip 17 therein in a direction normal to the moving directions (e.g., the vertical directions) of the terminal shear 14, as shown in FIG. 1. With the terminal 16 inserted within the terminal shear 14, extension of the applicator ram 18 in the downward direction is operative to bias the terminal shear downwardly via contact with a main depressor 15 for shearing the individual terminal 16 from the terminal strip 17.

Figure 3:
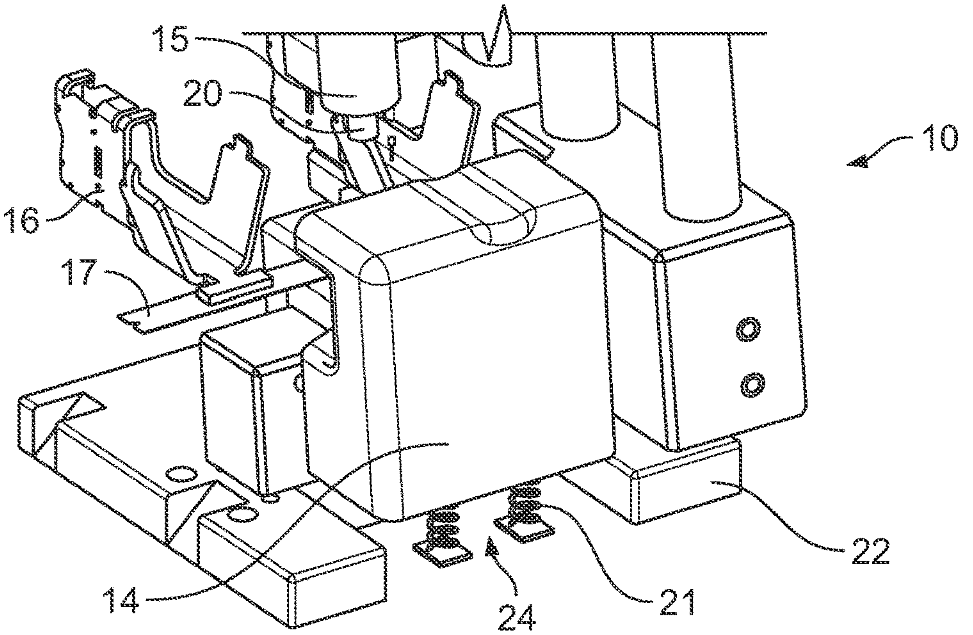
FIG. 3 is a perspective view of the terminal applicator of FIG. 1.

The terminal shear 14 may be movably or floatably mounted to the applicator 10, and more specifically, to a frame 22 thereof. In one embodiment, the terminal shear 14 is elastically mounted relative to the fixed frame 22 so as to resiliently return from a final post-shearing position to the initial position shown in FIG. 1 after shearing and crimping operations have been performed. More specifically, the shear 14 may be biased in a vertically-upward direction by one or more elastic elements, such as one or more springs 21, as shown in FIG. 3. It should be understood, however, that the terminal shear 14 may be floatable mounted and/or elastically biased by other arrangements, including spring elements positioned in any suitable location without departing from the scope of the present disclosure.

Embodiments of the present disclosure include a two-stage depressor for engaging with the terminal shear 14 for performing an improved shearing operation. In particular, the terminal shear depressor includes the main or first stage shear depressor 15. The first stage shear depressor 15 may take the form of a rigid cylinder, by way of example only. In the exemplary embodiment, the main stage shear depressor 15 is fixedly attached to the movable end of the applicator ram 18. As set forth above, the first stage shear depressor 15 is operative to engage with and apply a downward force on the terminal shear 14 for performing the shearing operation as the crimping die 12 is moved downwardly toward the terminal 16.

As described above, and as would be understood by one of ordinary skill in the art, during the crimping process, the terminal 16 may be subject to lengthening or extrusion via plastic deformation. This may result in the terminal 16 making contact with the terminal shear 14 which is arranged immediately adjacent thereto after the shearing operation. Embodiments of the present disclosure provide a means to ensure the terminal shear 14 does not interfere with or contact the terminal 16 as a result of its extrusion during crimping.

In particular, a second stage depressor or passive shear depressor 20 according to the present disclosure is provided and includes a movable plunger or piston arranged on and/or within an end of the first stage shear depressor 15. In the exemplary embodiment, the second stage shear depressor 20 may take the form of a cylindrical element. Of course, other shapes of both the first and second stage depressors 15,20 are envisioned without departing from the scope of the present disclosure.

Figure 4:
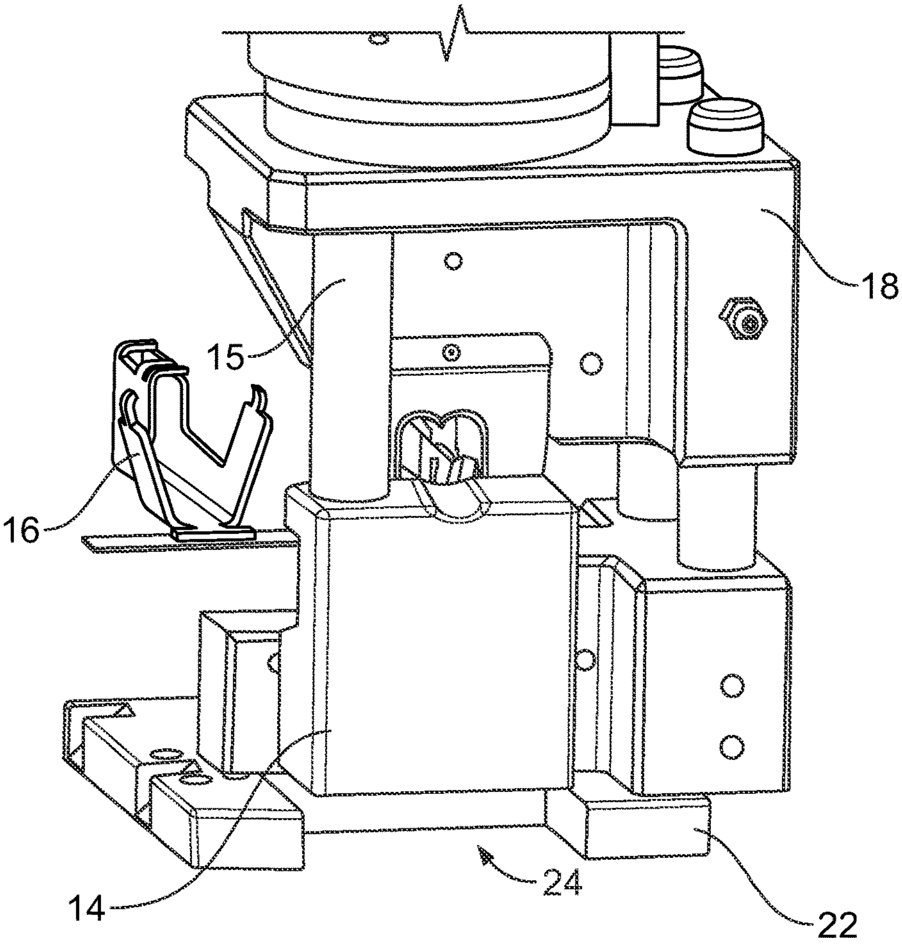
FIG. 4 is a perspective view of the terminal applicator in a first stage of a shearing process.
Figure 5:
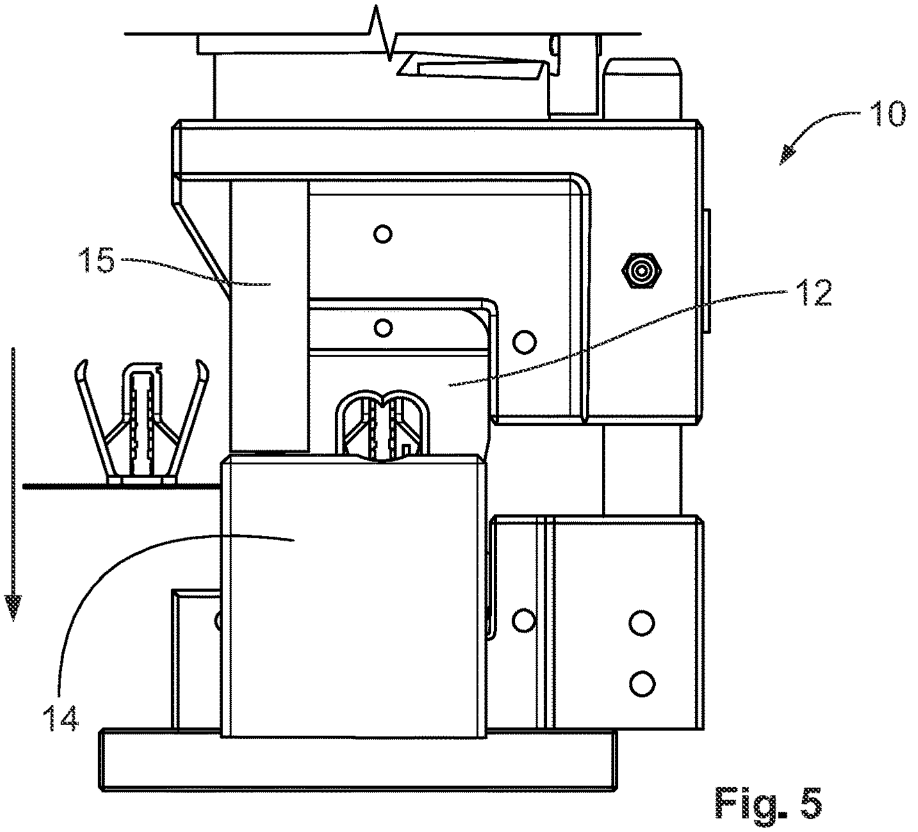
FIG. 5 is a perspective view of the terminal application after completion of the first stage of the shearing process.

The second stage depressor 20 is movable between an extended position, as shown in FIGS. 1-3 and 6, and a contracted position as shown in FIGS. 4 and 5. As described herein, the second stage depressor 20 is operative to engage with and bias the terminal shear 14 from an intermediate, post-shear position after the terminal 16 has been sheared from the terminal strip 17, into the final position and outside of an extrusion area of the terminal. In the exemplary embodiment, the base 22 defines a recess or opening 24 for receiving the terminal shear 14 as it is further downwardly biased during this second stage of movement.

Figure 7:
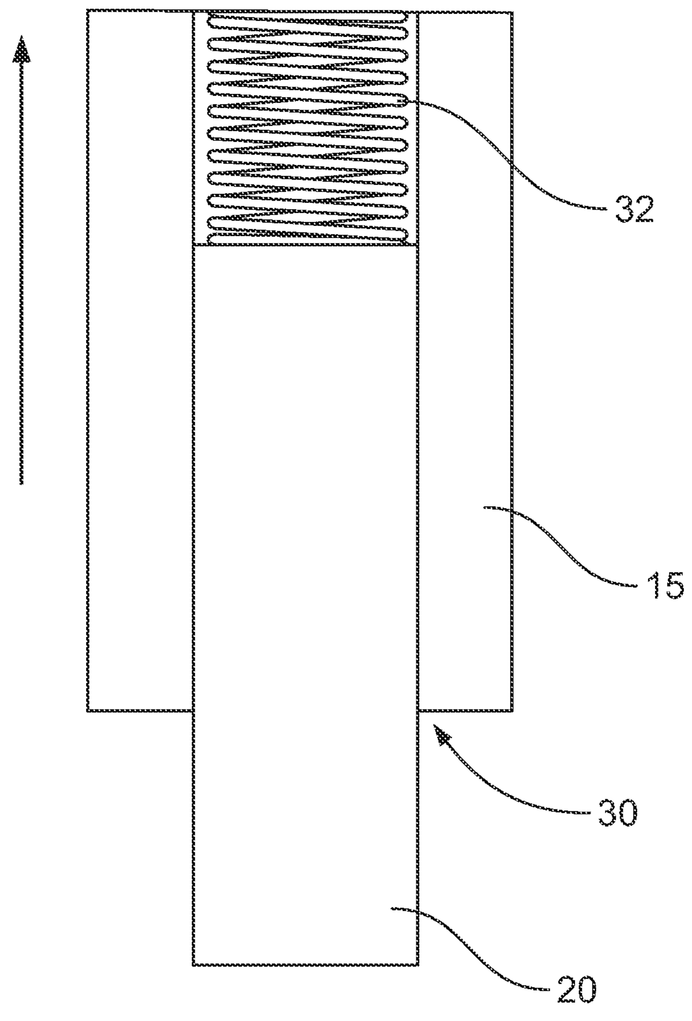
FIG. 7 is a partial cross-sectional view of a primary stage shear depressor and a secondary stage shear depressor according to an embodiment of the present disclosure.

The second stage depressor 20 may be passively elastically biased into the extended position via an internal spring arranged within the first stage shear depressor 15. As shown in FIG. 7, the second stage depressor 20 may be coaxially aligned with the first stage shear depressor 15 and, along with an elastic element 32 (e.g., a coil spring), slidably arranged within a corresponding cylindrical opening 30 formed in the free end of the first stage shear depressor. While a spring-loaded second stage shear depressor 20 is shown and described, other means may be used to passively bias the second stage shear depressor into the extended position, such as fluid (e.g., air or hydraulic fluid). In other embodiments, the second stage depressor 20 may be actively controlled via, for example, one or more actuators in conjunction with solenoids and associated control/processing hardware and software, as would be understood by one of ordinary skill in the art.

Figure 6:
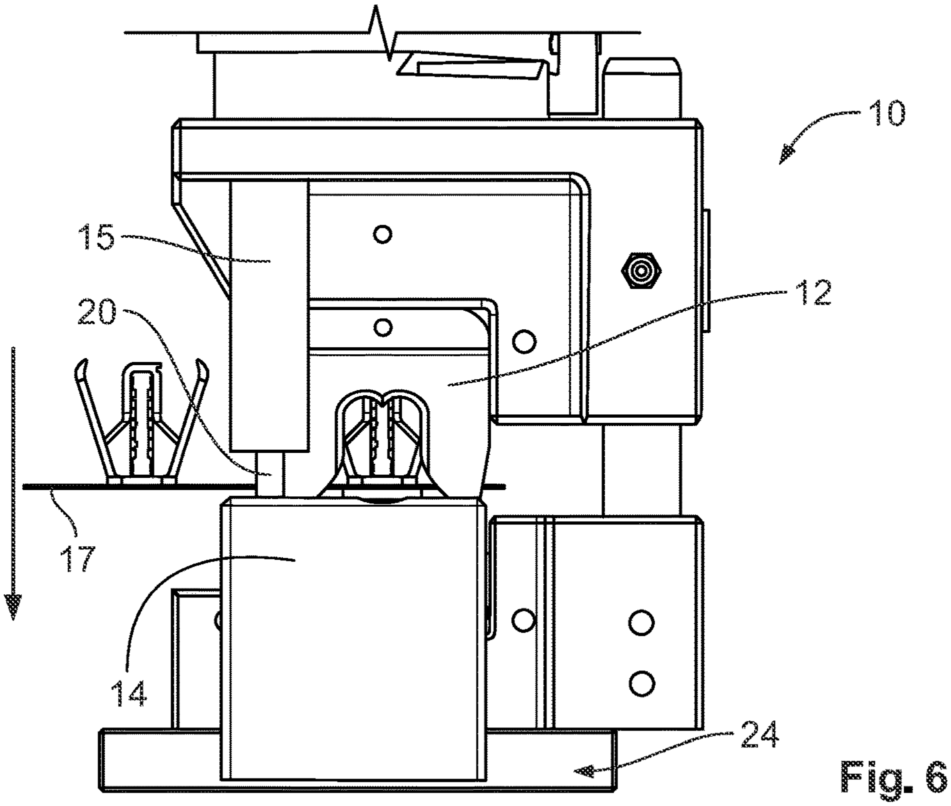
FIG. 6 is a perspective view of the terminal application after completion of a second stage of the shearing process or a second stage of shearing motion.

The operation of the two-stage shear depressor is shown in FIGS. 4-6. Referring to FIG. 4, the moving end of the applicator ram 18 has lowered the first stage shear depressor 15 into contact with the terminal shear 14. In turn, the terminal shear 14 is biased into initial contact with the terminal 16 of the terminal strip 17. The second stage depressor 20 is simultaneously biased into the contracted position within the opening formed in the end of the first stage shear depressor 15. More specifically, the elastic force biasing the second stage depressor 20 into the extended position is selected so as to be less than the force required to shear the terminal 16 from the terminal strip 17. In this way, the second stage depressor 20 is adapted to be passively biased into the contracted position prior to the shearing of the terminal 16 by the terminal shear 14.

As shown in FIGS. 5 and 6, the shearing step is completed by continued downward force acting on the terminal shear 14 via the first stage shear depressor 15. After the terminal 16 is sheared, the closing of the crimping dies 12,13 may cause the extrusion of the terminal 16. More specifically, according to embodiments of the prior art, the terminal shear 14 may remain present in an extrusion path of the terminal 16 until completion of the crimping operation, after which the terminal shear 14 is permitted to return to its initial position.

According to embodiments of the present disclosure, however, at the point which the terminal shear 14 just breaks through the strip 17 and disconnects the terminal 16 therefrom, the force resisting the extension of the second stage depressor 20 is released. The second stage depressor 20 is now free to extend from the end of the first stage shear depressor 15 under the biasing force of the spring, by way of example. As it extends, the second stage depressor 20 is operative to push or bias the terminal shear 14 from an intermediate position further vertically downward, and out of the extrusion area of the terminal 16. As shown in FIG. 6, in a lower or final position, the terminal shear 14 is arranged completely below the terminal 16 and/or the terminal strip 17, preventing its interference with the extrusion or lengthening of the terminal 16 during subsequent crimping. It should be understood that the spring force or biasing force acting on the second stage depressor 20 is selected so as to be greater than a return force biasing the terminal shear 14 into its initial position, but less than that required to shear the terminal 16.

Accordingly, embodiments of the present disclosure add a second, low-force tool or actuator within the primary shear depressor which can rapidly actuate the terminal shear and remove it from an extrusion area or window of a terminal to be crimped. After the terminal shear has completed the severing of the terminal from the strip, there is little resistance to further downward motion. As such, the second, low force stroke will then accelerate the terminal shear downwardly and out of the extrusion window before significant extrusion can occur. The second stage depressor may be always-acting (e.g., via a spring or air pressure), but of a low enough extension force that it the terminal shear position is unaffected until shearing is complete. In this way, no actively-controlled motor or valve is needed, nor software to control its operation.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A system for a terminal applicator for separating a terminal from a terminal strip comprising a plurality of interconnected terminals, the terminal applicator including a crimping die configured to crimp the terminal as the crimping die is brought into contact with the terminal using a crimping actuator, the system comprising:

a movable shear tool;

a primary shear depressor mounted to the crimping actuator and configured to come into contact with the movable shear tool to drive the shear tool from an initial position to an intermediate position to shear the terminal from the terminal strip as the crimping actuator moves the crimping die to crimp the terminal; and a secondary shear depressor movably mounted to the primary shear depressor so as to drive the shear tool from the intermediate position to a final position after the terminal has been sheared from the terminal strip by the movable shear tool.

2. The system of claim 1, wherein the secondary shear depressor drives the shear tool out of an extrusion path of the terminal during a crimping operation.

3. The system of claim 1, wherein the secondary shear depressor is elastically mounted to an end of the primary shear depressor, an elastic force biasing the secondary shear depressor into an extended position relative to the primary shear depressor.

4. The system of claim 3, wherein the elastic force biasing the secondary shear depressor is less than a force required to shear the terminal from the terminal strip with the shear tool.

5. The system of claim 4, wherein the shear tool is elastically biased in a direction opposite to a shearing direction of the shear tool.

6. The system of claim 5, wherein the elastic force biasing the secondary shear depressor into the extended position is greater than the elastic biasing force acting on the shear tool in the direction opposite the shearing direction.

7. The system of claim 6, further comprising:

a fixed frame supporting the shear tool;

wherein the crimping actuator has a fixed end mounted to the frame and a movable end, the primary and secondary shear depressors mounted to the movable end of the crimping actuator; and the crimping die is fixed to the movable end of the crimping actuator for crimping the terminal after it has been sheared from the terminal strip.

8. The system of claim 3, wherein the secondary shear depressor is biased into a contracted position relative to the primary shear depressor by the shear tool.

9. The system of claim 8, wherein the secondary shear depressor is biased into the contracted position as the primary shear depressor is brought into contact with the shear tool.

10. The system of claim 9, wherein the secondary shear depressor is a spring-biased piston received within the primary shear depressor in the contracted position.

11. The system of claim 1, further comprising a spring arranged between the primary shear depressor and the secondary shear depressor.

12. A method of separating a terminal from a terminal strip as a terminal applicator crimps the terminal, the terminal applicator crimping the terminal using a crimping die moved by a crimping actuator, comprising:

driving a shear tool in a first direction with a primary shear depressor mounted to the crimping actuator;

shearing the terminal from the terminal strip with the shear tool under a force applied by the primary shear depressor as the shear tool is driven in the first direction; and after the terminal has been sheared from the terminal strip, further driving the shear tool in the first direction with a secondary shear depressor movably mounted to the primary shear depressor such that the shear tool is out of an extrusion path of the terminal as the terminal applicator crimps the terminal using the crimping die.

13. The method of claim 12, wherein the secondary shear depressor is movably mounted to the primary shear depressor.

14. The method of claim 13, wherein the secondary shear depressor is elastically mounted to the primary shear depressor, an elastic force biasing the secondary shear depressor into an extended position relative to the primary shear depressor.

15. The method of claim 14, wherein the step of further driving the shear tool with the secondary shear depressor includes driving the shear tool under the elastic force imparted on the secondary shear depressor.

16. The method of claim 15, wherein the elastic force biasing the secondary shear depressor into the extended position is less than a force required to shear the terminal from the terminal strip with the shear tool.

* * * * *